United States Patent

Parker et al.

[11] Patent Number: 4,580,186
[45] Date of Patent: Apr. 1, 1986

[54] GROUNDING AND GROUND FAULT DETECTION CIRCUITS

[76] Inventors: Douglas F. Parker, 1717 Midwestern Pkwy., #233, Wichita Falls, Tex. 76302; W. Garth Bradshaw, P.O. Box 832, Lyman, Wyo. 82937; Mark J. Augustine, 2630 Minnesota Ct., Green River, Wyo. 82935

[21] Appl. No.: 735,730

[22] Filed: May 20, 1985

Related U.S. Application Data

[63] Continuation of Ser. No. 514,085, Jul. 15, 1983, abandoned.

[51] Int. Cl.⁴ .............................................. H02H 3/16
[52] U.S. Cl. ...................................... 361/42; 361/47; 361/50
[58] Field of Search ............................. 361/42, 47–50, 361/91; 340/650, 649, 651

[56] References Cited

U.S. PATENT DOCUMENTS

| | | | |
|---|---|---|---|
| Re. 26,683 | 10/1969 | Fanin et al. | 361/47 |
| 1,874,142 | 8/1932 | Tingley. | |
| 2,020,972 | 11/1935 | Starr | 175/294 |
| 2,844,765 | 7/1958 | Sosnoski | 317/18 |
| 3,242,382 | 3/1966 | Rogers, Sr. | 361/49 |
| 3,286,129 | 11/1966 | Gagniere | 361/47 |
| 3,402,326 | 9/1968 | Guasco et al. | 317/18 |
| 3,758,826 | 9/1973 | Zizola | 317/31 |
| 3,795,821 | 3/1974 | Ichiyanagi | 361/91 |
| 3,864,581 | 2/1975 | Satyanarayana | 361/42 X |
| 3,950,742 | 4/1976 | MacMartin et al. | 340/255 |
| 3,996,496 | 12/1976 | Volk, Jr. | 317/18 B |
| 4,121,590 | 10/1978 | Gonser | 128/303.13 |

FOREIGN PATENT DOCUMENTS 2359583 9/1974 Fed. Rep. of Germany ........ 361/42

Primary Examiner—Harry E. Moose, Jr.
Attorney, Agent, or Firm—Shapiro and Shapiro

[57] ABSTRACT

In an AC electric power system including a voltage source having a live conductor and a neutral, a grounding and ground fault detection circuit connected between the neutral and ground potential and comprising, in series, a current limiter, a rectifier, and a signal generator for providing a control signal in response to a ground fault current.

13 Claims, 3 Drawing Figures

GROUNDING AND GROUND FAULT DETECTION CIRCUITS

This is a continuation of application Ser. No. 514,085, filed July 15, 1983, now abandoned.

BACKGROUND OF THE INVENTION

This invention relates to grounding circuits for application in AC electric power systems. More specifically, this invention provides novel ground fault detection circuits which can provide both effective system grounding and protection for personnel and equipment from ground fault currents.

Prior ground fault detection circuits and similar circuits are subject to one or more of a variety of disadvantages including slow reaction time, spurious circuit response due to lack of discrimination between capacitive leakage currents and ground fault currents, unreliable operation, excessive complexity and high cost. The present invention avoids these and other disadvantages of the prior art.

SUMMARY OF THE INVENTION

In one of its aspects, the invention comprises rectifying means, current limiting means, and means for generating a control signal in response to a ground fault current, all connected in series between ground potential and neutral in an electric power system.

In another of its aspects, the invention further comprises a DC power supply, also connected in series.

The operation of the invention will be understood from the description of the preferred embodiments below with reference to the accompanying drawings.

DESCRIPTION OF THE PREFERRED EMBODIMENTS

In a typical AC electric power system, a transformer converts a primary supply voltage to a suitable secondary voltage for use in a power distribution network. The power distribution network includes the transformer secondary winding(s) and electric power conductors which deliver electric power from the secondary winding(s) to a load and which vary in number depending on the particular application. The transformer secondary includes a neutral point to which a power conductor may be connected, in which case the conductor is referred to as a neutral conductor. The neutral point or conductor (both hereinafter referred to as the "neutral") is connected directly to ground potential to provide an electrical ground for the power distribution network.

A significant and well-known characteristic of electric power systems of the type described is the presence of leakage currents due to capacitance between various system components. There is, among others, a leakage current from the power distribution network to ground due to capacitance between the electric power conductors and ground (hereinafter referred to as the "network leakage current"). The network leakage current flows in the connection between ground and neutral, and it is therefore important that a grounding and ground fault detection circuit have the capability to discriminate between such leakage current and ground fault currents in order to operate effectively.

Figure 1:
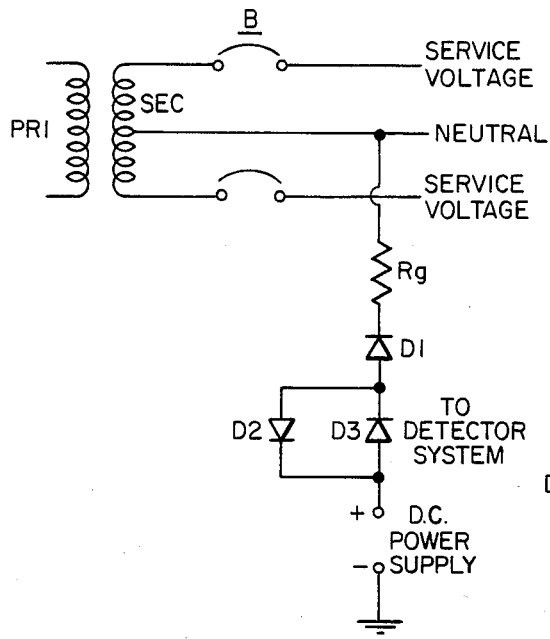
FIG. 1 is a schematic diagram of the invention as connected in a single-phase, three-wire AC electric power system.

Referring now to the accompanying drawings, FIG. 1 shows an embodiment of the invention connected in a single-phase AC electric power system. In the arrangement shown, the electric power system comprises a voltage source such as a transformer having a primary winding and a center-tapped secondary winding, designated PRI and SEC, respectively. Electric power conductors are connected to the transformer secondary winding SEC through a circuit breaker B or the like and include live service voltage conductors and a neutral (so designated). The electric power conductors are also connected in a conventional manner to an appropriate load such as household electric applicances (not shown).

In accordance with the invention as shown in FIG. 1, a grounding and ground fault detection circuit is connected between the neutral and ground potential (replacing the direct connection from neutral to ground) and may comprise rectifying means such as diode D1, current limiting means such as resistance $R_g$, means for generating a control signal in response to a ground fault current, which in the form shown is a light emitting diode D3 (connected with the same polarity as diode D1), and a DC power supply (so designated) connected, with the polarity shown, to diode D1. In the embodiment of FIG. 1, light emitting diode D3 is shunted by a surge suppressor (or protective) diode D2 to protect the former from reverse polarity surges. In practice, the need for surge suppression (or protective) means will depend on the characteristics of the particular control signal generating means employed.

Under normal operating conditions in the electric power system, no current flows in the grounding and ground fault detection circuit. Absent a ground fault in the power distribution network, there is, of course, no fault current present. Furthermore, the network leakage current is blocked due to the presence of diode D1. More specifically, because diode D1 will conduct only alternate half cycles of an AC signal (i.e., half-wave DC), the network leakage capacitance is permitted to charge but not to discharge. Accordingly, the network leakage current cannot flow, thus allowing for discrimination between such current and ground fault currents and avoiding the possibility of spurious circuit response to the leakage current. The voltage across the network leakage capacitance (i.e., the amount of charge stored in the capacitance), and therefore the voltage between the power distribution network and ground, will stabilize at a safe DC level which is dependent upon the primary-to-secondary coupling capacitance of the transformer and the network leakage capacitance to ground. The polarity of this voltage is established by the polarity of diode D1.

Upon the occurrence of a ground fault as, for example, by the accidental interconnection of a service voltage line and ground through a human body, a fault current flows through the grounding and ground fault detection circuit. The rectifying action of diode D1 restricts the current to DC (establishing its polarity as well), and current limiting resistance $R_g$ limits the current to a safe value. The DC current activates light emitting diode D3 which generates the desired control signal for a suitable detector system (so indicated) such as an optically isolated relay which can be connected in the usual manner to trip circuit breaker B and provide instantaneous separation of the ground fault from the transformer voltage.

Similarly, light emitting diode D3 is also activated in the event of a fault between the neutral and ground. Since the neutral is not live, however, the DC power supply provides the necessary current for this purpose. The voltage of the DC power supply must therefore be selected at a value sufficient to drive a current through the grounding and ground fault detection circuit which will activate light emitting diode D3 (or other signal generating means) under such circumstances. In a 120/240 volt power distribution network, for example, with current limiting resistance $R_g$ at 8,000 ohms (to limit ground fault currents to 15 milliamperes), a 24-volt power supply may be used to provide approximately 3 milliamperes. It should be noted that the detection of neutral to ground faults is desirable because the simultaneous presence of such a fault and a fault from a service voltage conductor to ground might permit a dangerous current resulting from the latter fault to bypass the grounding and ground fault detection circuit.

Figure 2:
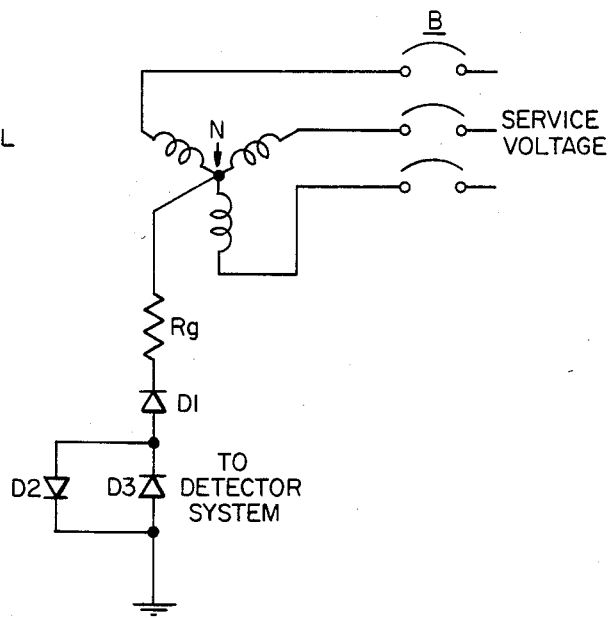
FIG. 2 is a schematic diagram of the invention connected in a three-phase, three-wire AC electric power system.

FIG. 2 shows a second embodiment of the invention connected in a three-phase, three-wire AC electric power system. In the form shown, the electric power system comprises a three-phase transformer having a set of primary windings (not shown) and a set of three secondary windings connected in a wye configuration with a neutral N. Live service voltage wires (so designated) are connected through a circuit breaker B or the like to the transformer secondary windings in a conventional manner.

In accordance with the invention as shown in FIG. 2, a grounding and ground fault detection circuit is connected between the neutral N and ground potential (replacing the direct connection from neutral to ground). In the form shown, the circuit comprises the same arrangement as was described with respect to the single-phase embodiment of FIG. 1, with the exception of the DC power supply which is not included. The DC power supply is excluded from the present embodiment since the power distribution network does not contemplate the presence of a neutral conductor. In a three-phase, four-wire electric power system, which contains a neutral conductor, a DC power supply could be included.

In operation, the invention as shown in FIG. 2 functions in substantially the same manner as the embodiment of FIG. 1, again with the exception of the DC power supply. Under normal operating conditions in the electric power system, there is no current flow through the grounding and ground fault detection circuit, there being no ground fault current and the network leakage current being blocked by the rectifying action of diode D1. As was previously described with respect to FIG. 1, the voltage between the power distribution network and ground stabilizes at a safe DC level dependent upon the transformer primary-to-secondary coupling capacitance and the power distribution network leakage capacitance to ground. In the event of a fault between a service voltage line and ground, such as by a connection through a human body, a fault current flows in the grounding and ground fault detection circuit. The current is DC due to the rectifying action of diode D1 (which also establishes the current polarity) and is limited to a safe level by current limiting resistance $R_g$. The DC current activates light emitting diode D3 which generates the desired control signal for a suitable detector system which, as was described with respect to FIG. 1, may be connected to trip circuit breaker B.

Figure 3:
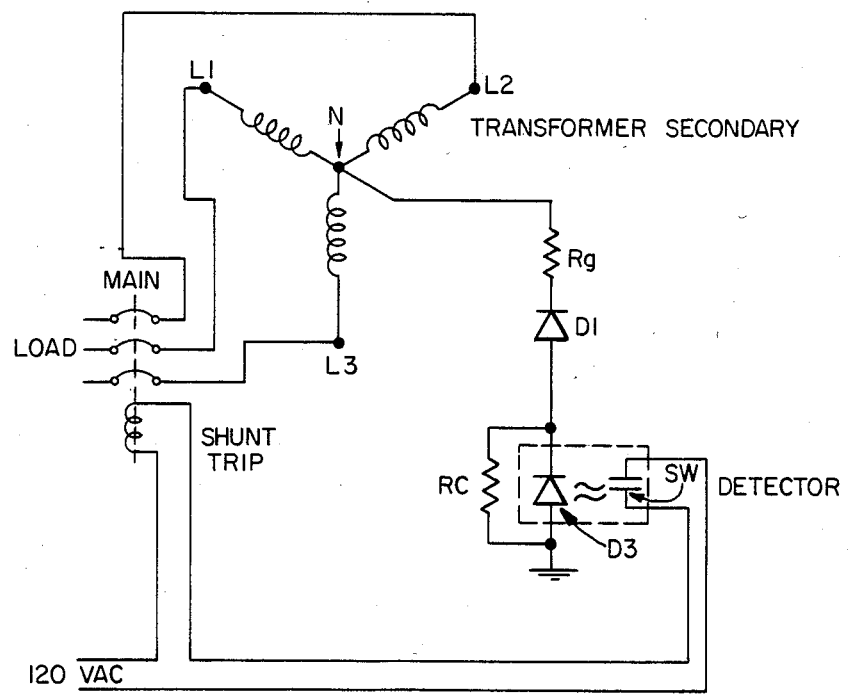
FIG. 3 is a schematic diagram of a practical application of the invention using the form shown in FIG. 2.

FIG. 3 shows a practical application of the embodiment shown in FIG. 2. Specifically, FIG. 3 again shows a set of wye-connected secondary windings in a three-phase transformer with a neutral N. For the purposes of the present example, the transformer secondary is assumed to be a conventional 277/480 volt arrangement. Live service voltage conductors L1, L2, and L3 are connected to respective secondary windings through a main circuit breaker (so designated) in the usual manner. The grounding and ground fault detection circuit is connected between the neutral N and ground potential as previously described. Current limiting resistance $R_g$ may be selected at a value of 1800 Ohms which will limit ground fault currents through the circuit to a safe level of approximately 15 milliamperes. Diode D1 may be a GE Model 1N3678. Light emitting diode D3 may be included in a detector, such as a Potter and Brumfield Model EOM 1DB22 optically isolated relay, which contains normally open switching means SW designed to close in response to the optical control signal generated by the diode D3. The switching means is connected in series with a 120 volt shunt trip coil (so designated) which will trip the main circuit breaker when energized. RC denotes a calibrating resistor for adjusting the detector fault current response level. Using the components specified, a value for RC of 560 Ohms will set the detector to respond at approximately 5.9 milliamperes.

When a ground fault occurs in the power distribution network shown, a DC current flows in the grounding and ground fault detection circuit at a maximum level of 15 milliamperes. If the fault current exceeds the preset circuit response level, light emitting diode D3 generates a control signal which results in the instantaneous closure of the normally open switching means SW. This energizes the b 120 volt shunt trip coil, which then trips the main circuit breaker, instantly separating the ground fault from the transformer voltage.

The invention described above provides means for both effective grounding and reliable protection against the hazards of ground faults in AC electric power systems. The invention provides grounding and ground fault detection circuits which discriminate against and thus avoid spurious response to network leakage currents, even though such currents may ordinarily be on the order of several amperes in a given system. In addition, these circuits effectively stabilize the voltage between a power distribution network and ground at a safe DC level. In a test case, for example, with a 150 KVA, 13,800/480 volt, three-phase transformer supplying a 100 horsepower load through several hundred feet of power cable, the power distribution network-to-ground voltage stabilized at 37 VDC (with a polarity established by the rectifying diode D1). Furthermore, the use of DC current in these circuits permits the application of high speed detectors, such as optically isolated relays, for extremely rapid separation of ground faults from a voltage source. In all test cases, the invention achieved clearing times of less than ¾ of one cycle.

While the preferred embodiments of the invention have been shown and described, it will be apparent to those skilled in the art that changes can be made in these embodiments without departing from the principles and spirit of the invention, the scope of which is defined in the appended claims. For example, the invention may be employed in electric power systems having voltage sources other than transformers. In any case, the voltage source includes at least a pair of terminals, one of which has a voltage with respect to the other, the latter being connected to ground by the grounding and ground fault detection circuit of the invention.

The invention claimed is:

1. In an AC electric power distribution system including an AC voltage source having a pair of terminals respectively corresponding to service voltage and neutral with a voltage applied therebetween, the service voltage terminal being at a potential to ground on the order of the applied voltage, a grounding and ground fault detection circuit connected between neutral and ground and comprising, in series, current limiting means, AC blocking means for preventing capacitive leakage current flow between ground and neutral through said circuit and for permitting DC current flow between ground and neutral through said circuit in the event of a ground fault, and means for generating a control signal in response to said DC current flow.

2. The invention of claim 1, wherein said voltage source includes a transformer.

3. The invention of claim 1, wherein said grounding and ground fault detection circuit includes, in series with said current limiting means, AC blocking means, and control signal generating means, a DC power supply for generating a DC current through said circuit in the event of a fault between neutral and ground.

4. The invention of claim 1, wherein said control signal generating means comprises light emitting means.

5. The invention of claim 1, wherein said AC blocking means is a half-wave rectifier.

6. The invention of claim 1, wherein said current limiting means comprises a resistance.

7. A grounding and ground fault detection system comprising, in combination, a transformer and a grounding and ground fault detection circuit, the transformer including a secondary winding having a pair of connection points respectively corresponding to service voltage and neutral with a voltage applied therebetween, the service voltage connection point being at a potential to ground on the order of said applied voltage, the grounding and ground fault detection circuit being connected between neutral and ground and including, in series, current limiting means, AC blocking means for preventing capacitive leakage current flow between ground and neutral through said circuit and for permitting DC current flow between ground and neutral through said circuit in the event of a ground fault, and means for generating a control signal in response to said DC current flow.

8. A system in accordance with claim 7, wherein said grounding and ground fault detection circuit further includes, in series with said current limiting means, AC blocking means, and control signal generating means, a DC power supply for generating DC current through said circuit in the event of a fault between neutral and ground.

9. A system in accordance with claim 7, wherein said transformer is a three-phase transformer with a wye-connected secondary.

10. A system in accordance with claim 7, wherein said AC blocking means is a half-wave rectifier.

11. A system in accordance with claim 7, wherein said current limiting means comprises a resistance.

12. A system in accordance with claim 7, wherein said control signal generating means comprises light emitting means.

13. A system in accordance with claim 12, wherein said grounding and ground fault detection circuit includes means for protecting said light emitting means.

* * * * *